July 6, 1965   W. F. SAUTHOFF   3,193,122
TRANSPORTATION SYSTEM FOR ELONGATED MEMBERS
Filed April 9, 1963   2 Sheets-Sheet 2
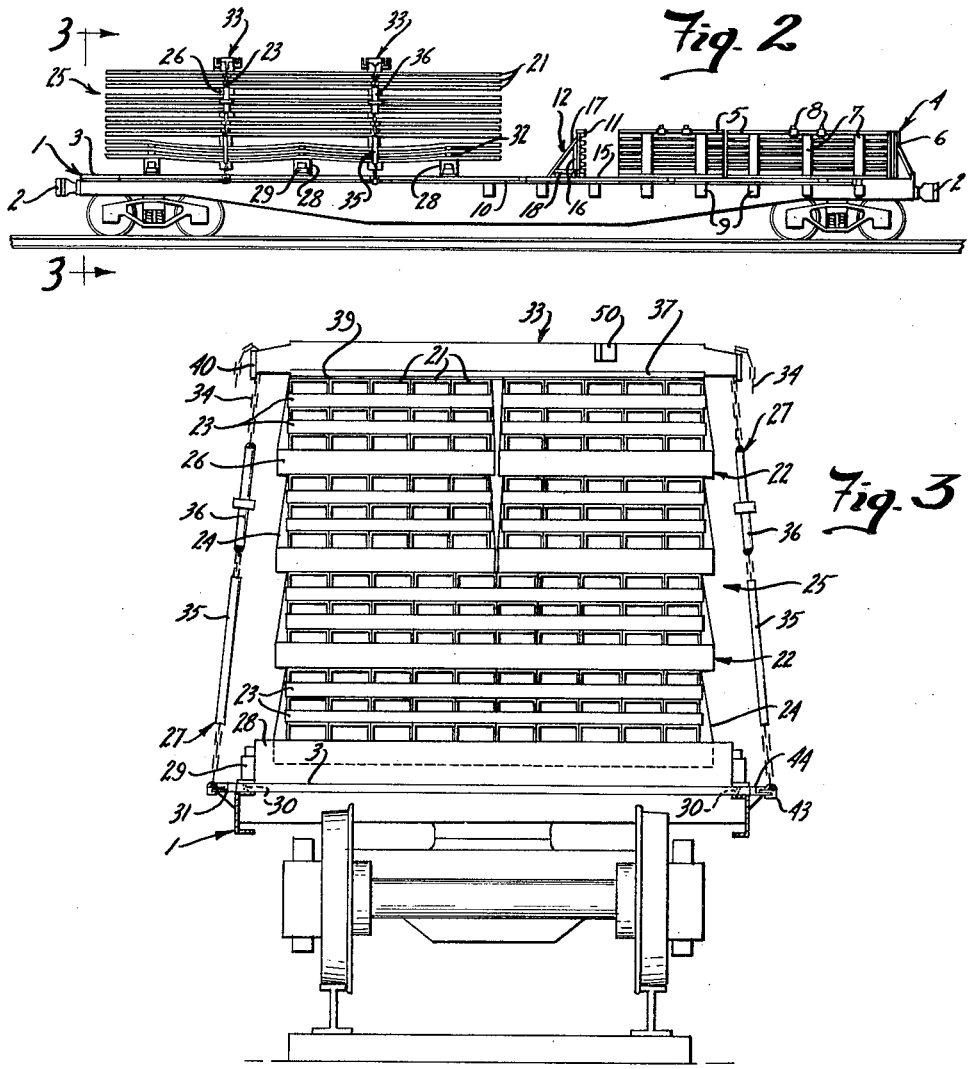
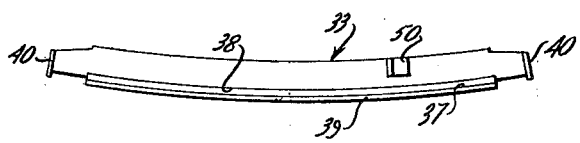
INVENTOR.
WALTER F. SAUTHOFF
BY
Howard J. Barnett
Attorney

United States Patent Office 3,193,122
Patented July 6, 1965

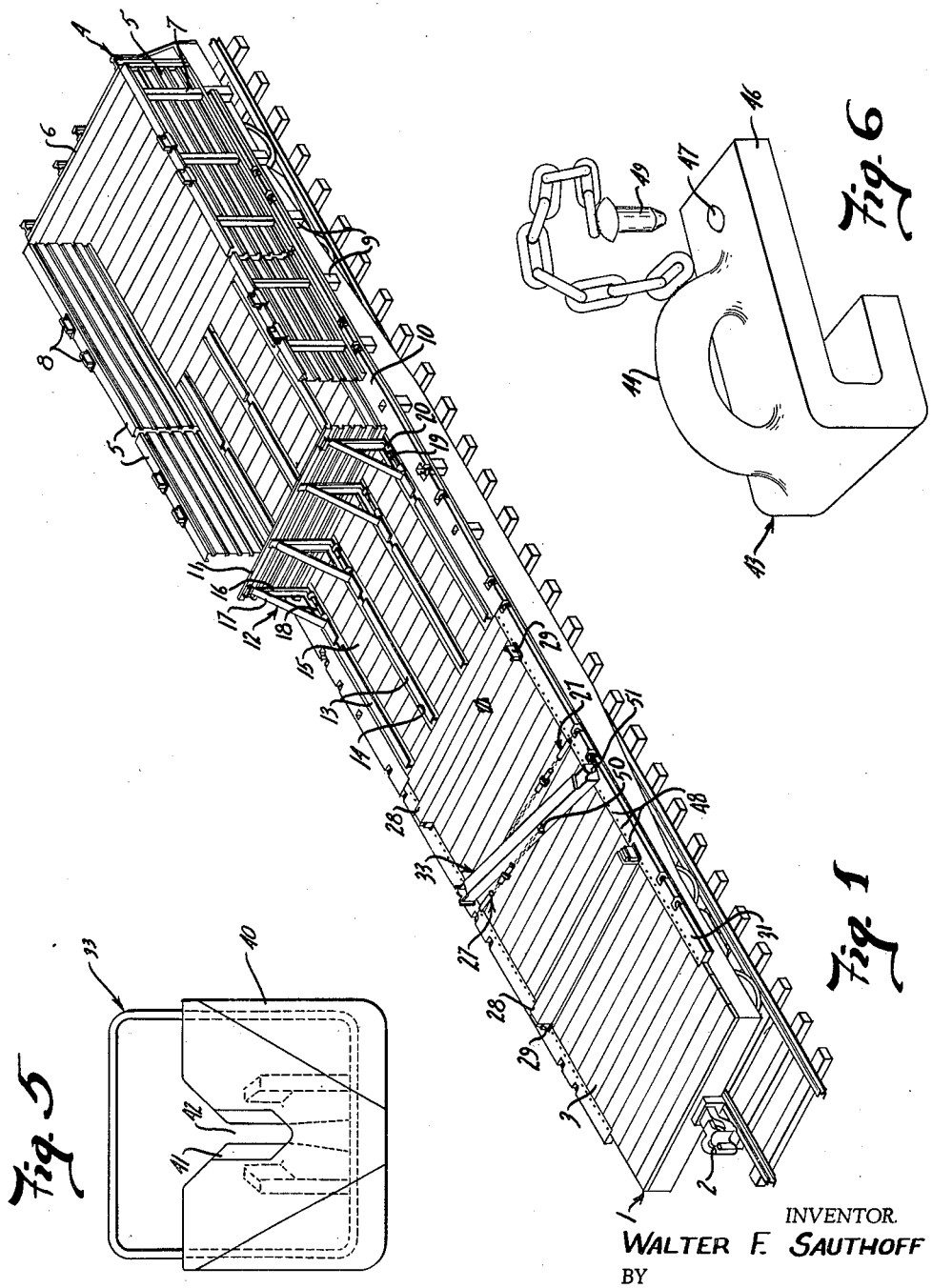

3,193,122
TRANSPORTATION SYSTEM FOR
ELONGATED MEMBERS
Walter F. Sauthoff, Milwaukee, Wis., assignor to A. O. Smith Corporation, Milwaukee, Wis., a corporation of New York
Filed Apr. 9, 1963, Ser. No. 271,709
2 Claims. (Cl. 214—152)

This invention is directed to a system for transporting articles, and more particularly, it is directed to means for flat loading long channel members on a railroad flatcar in a manner to avoid damage thereto from jerky stops and starts which inevitably occur during shipping, and which tend to cause excessive uncontrolled cargo shifting.

In the past, considerable difficulty was experienced with the shipment of long channel members on railroad freight cars. Partly because of their bulk, and partly because of their weight, these large metal members posed a real shipping problem.

Applicant's invention provides a flat loading system for long channel members which places predetermined tensions at certain points to effectively restrain the loaded channel members and thereby prevent damage due to excessive uncontrolled cargo shifting. The total load becomes a palletized unit which is flexibly anchored to the floor of the railway car.

This system permits the load to float as an integral unit upon impact, absorbing the inertial forces developed upon impact by stressing the load itself, and restraining the load by means of the cushioned tie-down apparatus of the invention. The individual channel members are tied together in a specific manner to permit them to deform a predetermined amount within the elastic limit of the loaded material.

The apparatus for assembling the load includes tie-down chains which apply increasing restraining forces as the load shifts. Rubber lined pre-cambered hold-down beams are disposed across the top of the load and are secured to the tie-down chains, which are then secured to the bed of the flatcar. The hold-down beams increase friction, distribute the load forces across the top of the load unit, and compensate for irregularities in the top of the load.

The palletized system of loading taught by this invention realizes a large economy in the handling of the large channel members, because a large number are bundled together initially, and may be handled as a bundle all the way from the initial bundling point at the point of manufacture to the final destination and assembly point, thus eliminating individual handling, storing and reloading of the members at intermediate points in the shipping process.

The apparatus of the invention provides a safe, economical means for shipping large, elongated members by means of railroad flatcars. The freight car of the invention is constructed so that it can be adapted to ship elongated members only, or a combination of palletized elongated members and smaller structural components. Removable partitions are provided for the smaller parts, and the dimensions of the partitioned portion of the load can be varied to accommodate a particular load combination containing a certain quantity of long side rails and smaller parts contained in the partitioned enclosure.

For added protection of the palletized long channel members, it is preferred that the railroad car be equipped with hydraulic draft gear. This hydraulic cushioning apparatus is incorporated into the car coupler mechanism to limit the intensity of acceleration and deceleration shocks, and experience has indicated that the inclusion of this hydraulic cushioning apparatus in the loading system of the invention will insure safe travel of the load with no damage thereto.

This invention provides a novel loading system for railroad shipment of elongated members which greatly facilitates loading and unloading, and provides complete protection for the load during shipping.

The following detailed description and the accompanying drawings illustrate the presently preferred means of carrying out the invention.

In the drawings:

FIGURE 1 is a three-quarter side elevational perspective view of the freight car of the invention in the unloaded condition;

FIG. 2 is a side view of the car in the completely loaded condition;

FIG. 3 is an end view taken along line 3—3 of FIG. 2 showing the tie-down system;

FIG. 4 is a side view of one of the tie-down beams showing the reverse camber when the beam is not under tension;

FIG. 5 is an enlarged detail of the end of the beam shown in FIG. 4 to illustrate the quick attachment means for the tie-down chains; and FIG. 6 is an enlarged detail of the removable eye and pin tie-down chain attachment means for connecting the tie-down chain to the freight car flat bed.

As shown in the drawings, the loading apparatus of the invention includes a standard freight flatcar 1 equipped with hydraulic cushioned couplers 2 at each end thereof. The bed 3 of the car 1 is substantially flat and includes a collapsible bin 4 at one end of the car 1. The collapsible bin 4 comprises a plurality of partition side sections 5, all fabricated to a standard unit size. End wall 6 is permanently attached to the car 1, while the side sections 5 are removable. Each side section 5 has a plurality of integral stanchions 7. Lift loops 8 at the top of each side section 5 facilitate easy removable of side sections 5. The bottoms of support stanchions 7 each extend downwardly into the floor of the car 1 into stanchion pockets 9, which are equally spaced along the side edges 10 of the car 1.

The bin 4 also includes a second end wall 11, which is disposed on bed 3 of the car 1. The end wall 11 is supported by a plurality of knee braces 12, which are adapted to slide on a plurality of longitudinal tracks 13, disposed in slots 14 of the car bed 3. The tracks 13 are flush with the top surface 15 of the bed 3 and are I-beams when viewed in section. As can be seen in FIGURE 1, each knee brace 12 includes a vertical support member 16, a diagonal brace 17, and a horizontal base 18, which is disposed on one of the tracks 13. The position of the end wall 11 can be adjusted by sliding the knee braces 12 along the tracks 13. A locking pin 19 is used to lock the knee braces 12, and consequently the end wall 11, in place. The knee braces 12 are restrained from vertical movement by locking shoes 20, which are slidably disposed on the tracks 13.

The length of the collapsible bin 4 can be varied in size over a considerable length of the car 1 to accommodate particular loading conditions. The bin 4 can even be eliminated entirely, except for permanent end wall 6.

One important feature of the loading system of the invention is the means for loading channel members 21 in a plurality of palletized bundles 22 on the end of the car 1 opposite bin 4. The palletized bundles 22 are each pre-assembled before loading, and they are stacked together and secured to the bed 3 of the car 1 in a specific manner as shown in FIGS. 2 and 3 to control load shifting during shipment.

As can be seen in FIG. 2, each of the palletized bundles 22 includes a plurality of cross brace wooden spacers 23 which space apart the individual channel members 21 and provide lateral stability in the bundles 22. The spacers 23 are disposed in a generally transverse vertical bank at predetermined intervals throughout the bundles 22. Each bundle 22 is bound together as a single palletized unit by means of a plurality of heavy metal straps 24, which extend around the bundle at preselected banks of the spacers 23. Each bundle 22 includes a bottom stress brace 26 disposed transversely across the bottom of each bundle in parallel horizontal tiers, as can best be seen in FIG. 3. The bundles 22 may be any desired width, depending on weight limitations. FIG. 3 shows both full car width and half car width bundles 22.

The bundles 22 are then assembled into a larger unit 25, which could be pre-assembled and handled as a single, unitary package if strapped together by additional metal straps 24, or the individual bundles 22 can each be separately loaded. As shown in FIG. 3, the channel members 21 are disposed against the adjacent channel members in the same layer to assure a tight bundle 22. When the load unit 25 is disposed on the car 1, as shown in FIG. 2, it is securely fastened thereto by means of a plurality of tie-down assemblies 27 which are disposed in a transverse vertical plane in relation to the load unit 25. The tie-down assemblies 27 are spaced at predetermined locations along the load, and the load unit 25 is supported at a predetermined distance above the bed 3 on a plurality of transverse wooden beams 28. In the embodiment shown, the beams 28 are not secured to the bed 3 of the car 1; however, they are restrained from horizontal movement by end brackets 29 which are secured by pins 30 through side rails 31 which extend along the sides of the car bed 3. In this manner, the beams 28 can be easily relocated to accommodate particular loading requirements.

The beams 28 provide means to raise the load unit 25 above the bed 3 of the car 1, thereby making is possible to bend a predetermined number of layers of bottom channel members 21 over the beams 28 to restrain fore and aft movement of the load. A plurality of stress braces 32 are disposed directly over the beams 28 between the rails 21 to transmit the bending force at beam 28 up through a predetermined number of layers of channel members 21.

The bending of the channel members 21 over the beams 28 is accomplished by means of the tie-down assemblies 27 which extend over the load units 25, as shown in FIG. 2. As mentioned above, the tie-down assemblies 27 are each disposed in a substantially transverse vertical plane taken through the load unit 25. Each tie-down assembly 27 is offset from the respective transverse beam 28 to bend the channel members 21 over the respective beam 28.

The tie-down assembly 27 includes a rubber-lined pre-cambered hold-down member 33, a pair of tie-down chains 34, and a resilient tensioning member 35. Also included in each tie-down chain 34 is a turnbuckle 36 for applying tension to the chain 43. The resilient tensioning member 35 is important to the invention, because it can be adjusted by means of turnbuckle 36 to provide a predetermined resilient tensioning force on the top of load unit 25 through the respective hold-down member 33. The shock absorbing or resiliency of the tensioning member 35 stabilizes the downward loading or bending of each channel member 21 which comprises a part of the load unit 25, and prevents over-stressing of any channel member 21 during shipping.

In the preferred embodiment of the invention, it has been found that a rubber-imbedded chain shock absorber is best for use as the resilient tensioning member 35. This type of shock absorber has proved dependable and durable in the most severe weather conditions.

As seen in FIG. 4, the pre-cambered hold-down members 33 each includes a metal plate 37, which is welded to the outwardly bowed surface 38 of the hold-down member 33. The plate 37 is lined on its outer surface with a resilient rubber pad 39, which is bonded to the plate 37. The pad 29 protects the channel members 21 from damage by the hold-down members 33 by interposing a resilient material between the load unit 25, and the hold-down member 33. The plate 37 is provided to facilitate replacement of worn pads 39. The complete plate 37 is simply removed and replaced with another plate 37 having a new pad 39 bonded thereto.

The ends of the hold-down members 33, include a cast chain receiving member 40, shown in FIG. 5, having a hardened end surface 41 and including a slot 42 in which the tie-down chain 34 is secured.

The other end of the tie-down chain 34 is connected to a rapid disconnect clevis 43, which is slidably received in slot 44 in the bed 3 of the car 1. An enlarged perspective view of the clevis 43 is shown in FIG. 6, and it can be seen that the clevis 43 includes a loop 44, which is adapted to receive the end of the tie-down chain connector 45. The base 46 of the clevis 43 has an aperture 47, which lines up with a recess 48 in the bed 3. A locking pin 49 is inserted through aperture 47, and extends into recess 48 to lock the clevis 43 in place during shipment of the load unit 25.

In use, the loading system of the invention provides a rapid and efficient means for loading flatcars with elongated members for safe shipment. The same loading system can obviously be adapted for shipment by flatbed truck trailer, and for securing a load for shipment on board a ship.

To assemble the load unit 25, the palletized bundles 22 are first stacked on the beams 28 on the bed 3. The rubber-lined, pre-cambered hold-down members 26 are then disposed transversely along the top of load unit 25 at predetermined intervals. The surface of the hold-down member 33 which includes plate 37 and the rubber pad 39 is disposed against the top of load unit 25. The ends of hold-down member 33 are slightly displaced from the load unit 25 when in this position due to the reverse chamber thereof, as can be seen in FIG. 4.

The tie-down assemblies 27 are next connected to the chain receiving members 40 in each end of the hold-down member 33. The opposite end of each tie-down assembly 27 is also connected to one of the clevises 43 disposed in slots 44 in the bed 3 of the car 1.

After the tie-down assembly 27 has been connected at both ends in the manner described, the turnbuckle 36 is tightened until the tensioning member 35 and the tie-down assembly 27 are subjected to a predetermined tensioning force which is sufficient to urge the complete hold-down member 33 and rubber pad 29 against the top of the load unit 25. A small additional tightening of turnbuckle 36 causes the bottom channel members 21 to take a temporary bend over the transverse beams 28, and this load is transmitted up through the next tier of channel members 21 by the stress brace 32, thereby providing substantial resistance to fore and aft shifting of bundle 21.

During shipment, if the car 1 is required to stop suddenly, the load units 25 tend to shift forward. However, since the bottom channel members 21 are bent over the beams 28 in at least two parts of the load, the inertial forces are partly absorbed in bending the members 21 in the bottom tiers of the load unit 25.

After the load units 25 are unloaded at destination, the car 1 can be loaded for the return trip with almost any type of flatcar freight, since the beams 28 can readily be removed. In the event that it is required that car 1 be returned to the manufacturer empty, then the hold-down members 33 can be secured on the bed 3 in the manner shown in FIGURE 1. Each hold-down member 33 has a pair of slots 50 for receiving the end of one of the tie-down assemblies 27 which secure the members 28 on the car 1 for the return trip. A short chain 51 is secured to each end of the beam 33, and the other end of the short chain 51 is attached to the edge 10 of the car bed 3. In this manner, the first tie-down assembly 27 can be tightened against the second one to firmly secure the beam 33 on bed 3.

The apparatus of the invention provides a time-saving, safe method of transporting large truck side rails and other large structural members in a combination loading system with other types of goods with substantially no lading damage en route. The system avoids unnecessary handling of the structural members and eliminates considerable shipping cost by making it possible to accommodate various length structural members, as well as various proportioned quantities of bin shipped items. Because the apparatus is versatile, and can speedily accommodate different types of loads, as well as different combinations of the different load types, it eliminates the problem of returning the car "dead head", or empty, to its destination, and the consequent loss in profitable use of the car.

Various modes of carrying out the invention are contemplated as being within the scope of the following claims particularly pointing out and distinctly claiming the subject matter which is regarded as the invention.

I claim:

1. A method of shipping a load of elongated channel members on a freight car having a flat bed, the steps comprising, disposing a plurality of raised beams transversely on said flat bed, loading a plurality of palletized bundles of elongated channel members lengthwise of the bed in tiers across said beams, said bundles each having a plurality of stress braces disposed transversely between adjacent bottom tiers of channel members directly above said beams, said stress braces being adapted to transfer loads upwardly from said transverse beam to the next adjacent tier of channel members, positioning a plurality of cross braces between adjacent channel members and positioned between the raised beams to provide a predetermined spacing between adjacent bundles, and securing said palletized bundles into a unitary load by means of a plurality of tie-down assemblies laterally offset from said beams, said tie-down assemblies including tensioning means for bending at least the bottom tier of said channel members over said beams whereby excessive cargo shifting is effectively prevented.

2. The method of claim 1 wherein each of said tie-down assemblies includes a precambered cross bar extending across the top of said load in alignment with said cross braces with the cross bars curved from the center upwardly to space the bar ends in spaced relation to the top of the load, connecting each end of said cross bars to the flat bed of said carrier by means of the tensioning means and pulling each precambered cross bar downwardly to engage the aligned top portion of the load throughout its length and thereby provide a compression force on the load.

References Cited by the Examiner

UNITED STATES PATENTS

| | | | |
|---|---|---|---|
| 691,140 | 1/02 | Hines | 214—10.5 |
| 1,583,647 | 5/26 | Bayles | 214—10.5 |
| 1,583,873 | 5/26 | Fricke | 105—367 |
| 1,668,530 | 5/28 | Romine | 214—152 |
| 1,900,756 | 3/33 | Butts | 214—152 |
| 2,012,220 | 8/35 | Chambers | 214—152 |
| 2,415,368 | 2/47 | Pierce | 105—367 |
| 2,898,872 | 8/59 | Hastings | 105—367 X |
| 2,915,991 | 12/59 | Koth | 214—10.5 X |
| 2,987,308 | 6/61 | Symons. | |
| 3,017,171 | 1/62 | Mather. | |

HUGO O. SCHULZ, *Primary Examiner.*

MORRIS TEMIN, *Examiner.*